United States Patent
Kalach et al.

(10) Patent No.: US 7,552,115 B2
(45) Date of Patent: Jun. 23, 2009

(54) METHOD AND SYSTEM FOR EFFICIENT GENERATION OF STORAGE REPORTS

(75) Inventors: Ran Kalach, Bellevue, WA (US); James R. Benton, Seattle, WA (US); Paul Adrian Oltean, Redmond, WA (US); Georgi M. Matev, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 11/107,977

(22) Filed: Apr. 15, 2005

(65) Prior Publication Data

US 2006/0236069 A1 Oct. 19, 2006

(51) Int. Cl.
*G06F 17/30* (2006.01)
*G06F 7/08* (2006.01)
*G06F 7/16* (2006.01)

(52) U.S. Cl. .............................. 707/4; 707/3; 707/104.1
(58) Field of Classification Search ...................... 707/3, 707/4, 104.1
See application file for complete search history.

(56) References Cited

U.S. PATENT DOCUMENTS

| | | | |
|---|---|---|---|
| 5,218,695 A * | 6/1993 | Noveck et al. .............. | 707/205 |
| 5,423,015 A * | 6/1995 | Chung ........................ | 711/108 |
| 5,506,977 A * | 4/1996 | Jones ......................... | 711/155 |
| 5,678,042 A | 10/1997 | Pisello et al. | |
| 5,923,850 A | 7/1999 | Barroux | |
| 6,041,420 A | 3/2000 | Skarpelos et al. | |
| 6,405,219 B2 * | 6/2002 | Saether et al. .............. | 707/201 |
| 6,430,611 B1 * | 8/2002 | Kita et al. ................... | 709/223 |
| 6,571,257 B1 * | 5/2003 | Duggan et al. .............. | 707/202 |
| 6,640,217 B1 | 10/2003 | Scanlan et al. | |
| 6,658,436 B2 | 12/2003 | Oshinsky et al. | |
| 6,681,310 B1 * | 1/2004 | Kusters et al. .............. | 711/202 |
| 6,760,719 B1 | 7/2004 | Hanson et al. | |
| 2002/0175938 A1 | 11/2002 | Hackworth | |
| 2004/0054987 A1 | 3/2004 | Sonpar et al. | |

(Continued)

OTHER PUBLICATIONS

Abbott, R.K.; Garcia-Molina, H., "Scheduling I/O requests with deadlines: A performance evaluation ," Real-Time Systems Symposium, 1990. Proceedings., 11th , vol. No. pp. 113-124, Dec. 5-7, 1990.*

(Continued)

*Primary Examiner*—John E Breene
*Assistant Examiner*—Patrick E Sweeney
(74) *Attorney, Agent, or Firm*—Workman Nydegger (57) ABSTRACT

Described is a method and system by which reports of storage usage in computer systems are generated in an efficient manner by consolidating multiple requests for reports into a minimal number of volume scans, including by intelligently selecting a scanning method (e.g., of file system metadata versus find-first/find-next) and by performing parallel scans on different volumes. Namespace consolidation scans namespaces together, so as to generate multiple reports from the same set of files, reducing the number of volumes scans required to collect the data. Each volume scan may be a find-first, find next directory-based scan, or a volume metadata database scan. Time consolidation groups independent storage report generations together, such as storage report requests received within an administrator-specified interval. Parallel scans of different volumes may be performed, subject to I/O and processing resource limitations, and so that volumes partitioned on the same spindle are not scanned in parallel.

20 Claims, 7 Drawing Sheets

U.S. PATENT DOCUMENTS

2004/0186951 A1* 9/2004 Iren et al. .................... 711/112
2006/0155946 A1* 7/2006 Ji ................................ 711/162

OTHER PUBLICATIONS

Kamel, I.; Niranjan, T.; Ghandeharizedah, S., "A novel deadline driven disk scheduling algorithm for multi-priority multimedia objects," Data Engineering, 2000. Proceedings. 16th International Conference on , vol. No. pp. 349-361, 2000.*

Iyer, S. and Druschel, P., "Anticipatory scheduling: a disk scheduling framework to overcome deceptive idleness in synchronous I/O", ACM SIGOPS Operating Systems Review, 2001, ACM Press New York, NY, USA, vol. 35 No. 5, pp. 117-130.*

Steve Carter, Tia Alexander, Ram Bhoopalam, Anne Carlson, Siu Chang, Angela Hsieh, Elizabeth Mitcham, John Mitcham, Tony Onisko, Georges Smine, Sara Woodhull, "Oracle Applications System Administrator's Guide Release 11", 1998, Oracle Corporation, pp. 6-1-6-31.*

Robert Ross, "Reactive Scheduling for Parallel I/O Systems", 2000, Electrical and Computer Engineering Dept., Clemson University.*

* cited by examiner

METHOD AND SYSTEM FOR EFFICIENT GENERATION OF STORAGE REPORTS

FIELD OF THE INVENTION

The invention relates generally to computer systems, and more particularly to computer files and storage.

BACKGROUND

Managing storage in enterprise configurations is a complex process that presents information technology (IT) departments with many challenges. One such challenge is defining and implementing corporate storage policies. Another challenge is related to what is essentially an explosion in the amount of data to store, which forces IT departments to continually readjust existing storage policies according to usage growth. Yet another challenge is redefining the storage policies as a response to the changes in the utilization model, such as when installing new applications, handling organizational changes, service level agreement (SLA) changes, and so forth.

"Storage Reports" is a service comprising a technology/functionality that provides a set of storage reports to be used by IT administrators to efficiently audit and track the filesystem and quota usage for large volumes. For example, an administrator may want to see a sorted list of all files larger than one-hundred megabytes on a given namespace, sorted by size, and with summary information on totals. Another such report may provide summary information for each file type (e.g., "Media Files") on a given namespace, including the one-hundred largest files within each file type category. Thus, storage reports help an administrator identify inefficient use of storage, implement mechanisms to prevent future misuse, monitor usage patterns and utilization levels on file servers and other servers, anticipate storage needs, analyze emergency situations and take preventive and/or corrective actions.

While storage reports thus provide valuable functionality, generating the storage reports can take a considerable amount of time, and also consume significant input/output (I/O) and processor resources. This is because in general, to generate a storage report requires scanning one or more storage volumes, each of which may be very large. For example, scanning a terabyte-sized volume may take on the order of hours, with significant disk I/O and data processing required to perform the scan.

In general, better storage management tools are needed in management software. One valuable improvement would provide a way to generate storage reports that is efficient, fast and non-intrusive in terms of resource consumption.

SUMMARY OF THE INVENTION

Briefly, the present invention is directed towards a method and system by which storage reports are generated based on a plan that reduces or avoids redundant scans to increase efficiency. In general, this may be accomplished by consolidating separate namespaces on which to generate reports, and/or by consolidating report requests received at different times. The present invention may also plan the parallel scanning of different storage volumes. Scanning may be of volume snapshots, and may take place on the files directly in a find-first, find-next directory traversal, or by scanning file system metadata, such as arranged in a database-like structure on a storage volume.

In one example implementation, a storage report engine receives parameters for creating storage reports, including one or more namespaces and filtering criteria to limit the report to match certain file metadata, e.g., type, size, age and/or other metadata. The report may be scheduled.

The present invention attempts to minimize the number of scans that are required to collect the storage report data by performing namespace consolidation, which essentially looks at the namespaces together when determining an efficient scanning method. Via namespace consolidation, multiple reports may be generated over the same set of files, whereby the number of volumes scans required to collect the data is reduced. Each volume scan may be a find-first, find next directory-based scan, or a volume file system metadata scan, depending on which is more efficient when a file system metadata scan is available.

Another way to gain efficiency is via time consolidation, in which independent storage report generations that are close together in time are run together, when possible. For example, when two or more different storage reports are requested within an administrator-specified interval, the requests are consolidated, such as into a single scan per volume.

The planning module may perform additional scheduling and/or staging of the scanning process, such as to perform parallel scans of different disks. Resource limitations such as I/O and processing constraints limit the number of volumes that are scanned at once. Also, volumes partitioned on the same spindle are not scanned in parallel.

To efficiently plan a volume set scan, a planning module analyzes various sets of information related to a scan, including a namespace list, volume-to-disk mapping data for scheduling parallel scans and previous activity hints. Previous activity hints provide information from at least one (e.g., the most recent) previous scan to better optimize the forthcoming scan. For example, the previous activity hints may include information such as the total number of files and directories on a volume, and the number of files and directories in a requested namespace or set of namespaces, the amount of fragmentation of the metadata database, and the like. With such hints, the planning module is able to determine whether it is more efficient to scan a volume via a find-first, find-next method, or by scanning the file system metadata.

During the actual volume scan or scans, hits are collected and preserved for a future scan. Following the scan the storage reports are rendered in accordance with the requests.

Other advantages will become apparent from the following detailed description when taken in conjunction with the drawings, in which:

DETAILED DESCRIPTION

Exemplary Operating Environment

Figure 1:
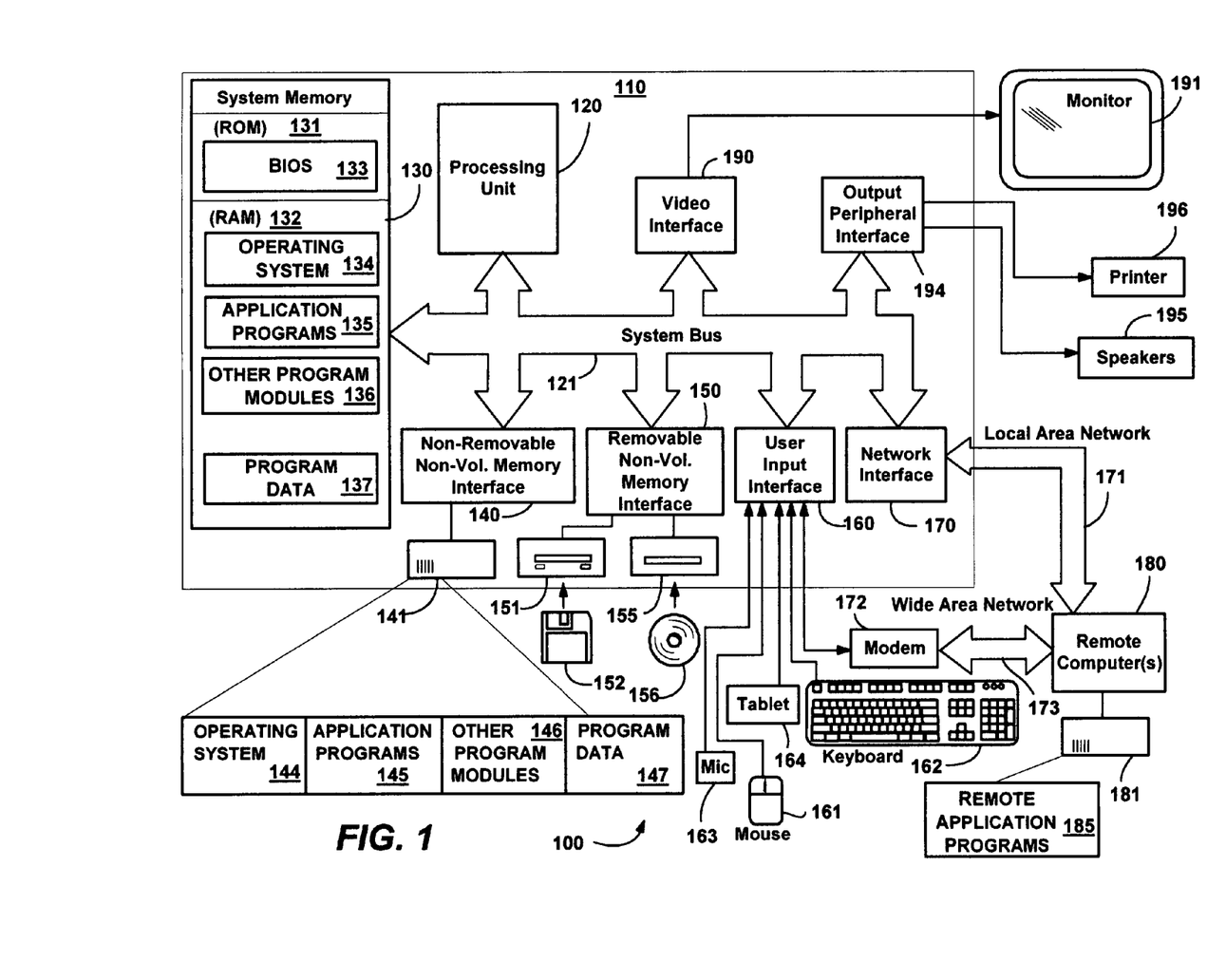
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. The main computer system 120 may store some or all of its data on a storage area network.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Efficient Generation of Storage Reports

The present invention is generally directed towards a method and system by which the generation of storage reports for storage volumes is automatically pre-planned to increase efficiency. In general, this may be accomplished by consolidating separate requests for storage reports into a single scan or lesser number of scans where possible, including by consolidating separate namespaces on which to generate reports, and/or by consolidating time-independent reports. The present invention may also pre-plan the parallel scanning of different storage volumes. As will be understood, numerous ways to implement the present invention are feasible, and only some of the alternatives are described herein. For example, copending U.S. patent application Ser. No. 11/107,119, entitled, "Generating Storage Reports Using Volume Snapshots" filed concurrently herewith, assigned to the assignee of the present invention and hereby incorporated by reference in its entirety, describes a mechanism by which a snapshot of the volume (or some subset thereof) rather than the "live" volume itself is scanned to generate storage reports. With the technology described therein, scanning may take place on the files directly in a find-first, find-next directory traversal, or by scanning file system metadata, (e.g., in the master file table, or MFT, in Microsoft Corporation's NTFS storage technology). While not necessary to some of the aspects of the present invention, scanning the snapshot provides numerous advantages and benefits, including that a consistent point-in-time scan may occur across multiple volumes, and also that a file system metadata scan is a practical option. Thus, except where otherwise noted, the present invention will be described with reference to a snapshot scan. Notwithstanding, the present invention is not limited to a volume snapshot scan, nor to any particular examples used herein, but rather may be used various ways that provide benefits and advantages in computing in general.

Figure 2:
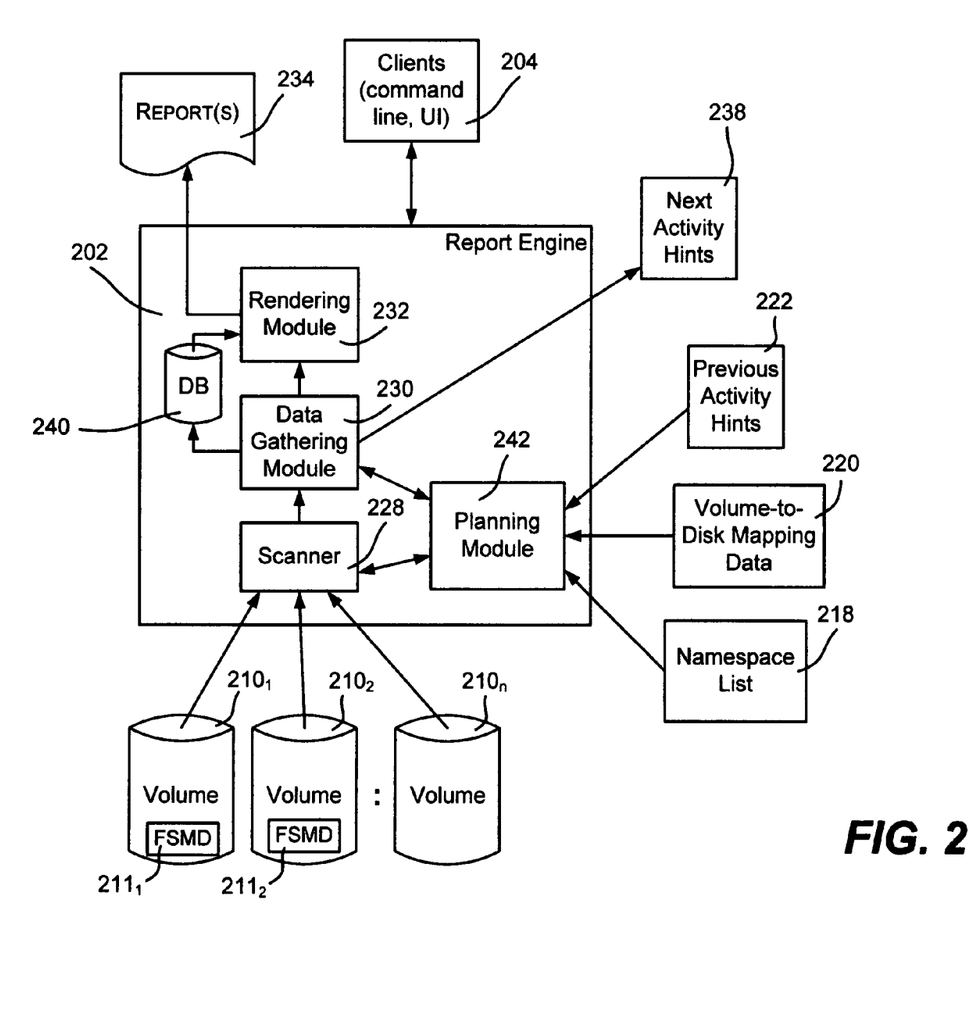
FIG. 2 is a block diagram representing an architecture comprising various components for efficient execution of volume scans to generate storage reports, in accordance with various aspects of the present invention.

Turning to FIG. 2, there is shown a block diagram that represents an example architecture into which the present invention may be incorporated. In one example implementation, a storage report engine 202, which may provide a user interface, or may be executed by a command line or other client program, as represented by the block 204, receives parameters for creating a storage report set of one or more storage reports. An administrator may specify paths for which a report is desired; by way of example, a user or program may request that a storage report gather information from a list of namespace roots, such as {C:\, D:\foo and E:\bar\}. Note that volume mount points, in which a user mounts a volume in a directory, typically for using a pathname instead of a drive letter, are supported.

The administrator may also specify one or more file-related (metadata) filtering criteria to limit the report, e.g., files more than two years since last accessed, media files more than ten megabytes in size, and so forth. The report may be scheduled or created on demand.

In accordance with an aspect of the present invention, rather than treat separate requests for storage reports and/or different namespaces separately, the present invention attempts to reduce the number of scans that are required to collect the storage report data. To this end, namespace consolidation is performed, which essentially looks at every storage report-requested namespace together when determining an efficient scanning method, regardless of whether they are received in one request or independent requests. Namespace consolidation is done for efficiency, because multiple reports may be generated over the same set of files, whereby the volume scanning process may consolidate possibly many scans for multiple reports into a single scanning phase. Note that efficiency is especially important when the set of files to be scanned is relatively large, because when there are a large number of files, most of the generation time is spent in scanning the file system to gather the necessary data to generate the report.

Figure 3:
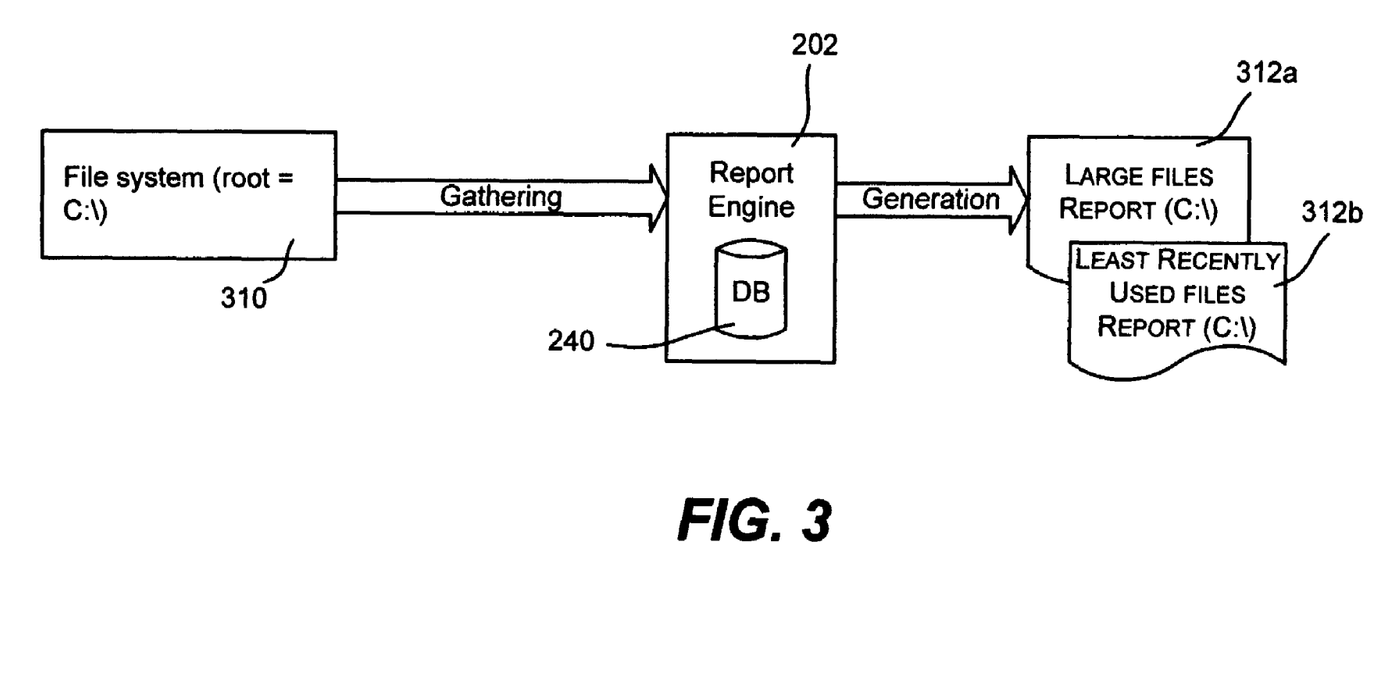
FIG. 3 is a block diagram representing simultaneous or near-simultaneous generation of storage reports from volume scanning, in accordance with various aspects of the present invention.

By way of example of efficient, simultaneous generation of multiple storage reports on the same set of files, FIG. 3 shows the generation of two reports ("Large Files" and a "Least Recently Used Files") from a single scan of a volume 310, the C:\volume. These reports are scheduled to run simultaneously, e.g., at 12:00 AM. As can be seen, by performing a single scan on C:\, two storage reports 312a and 312b are obtained, each of which are based on intermediate data that was generated during the scan. In one implementation, the report engine 202 maintains a database 240 or the like of the intermediate data, e.g., internally or otherwise associated therewith.

Returning to the example implementation of FIG. 2, the storage reports generation engine 202 essentially comprises a service that implements report configuration and on-demand or scheduled report generation, using various internal (or otherwise associated) modules. For example, a scanner module 228 performs the actual scan, while a data gathering module 230 used to gather the data. A rendering module 232 generates the reports 234 in file format or some other way. Other modules, such as a configuration module used to store the report configuration, may be provided. As can be readily appreciated, this is only one example implementation, and alternatively some of these modules may be combined, or further separated into other modules.

In general, the data gathering module 230 controls a data gathering stage, in which the data of the file system volume or volumes (e.g., $210_1$-$210_n$) is collected, along with other interesting information such as activity hints 238 for the next scan, as described below. In this phase, the report engine 202 obtains the data that will appear in the report contents, such as to enumerate large files in the "Large Files" report. The gathered data is saved in a temporary location, represented in FIGS. 2 and 3 by the database (DB) 240.

A rendering phase generates the report files, in which the rendering module 232 uses the generated data in the database 240 to create reports in the form of files. The reports may be rendered in a desired given format (HTML, CSV, TXT, and so forth), or optionally sent to the user by electronic mail and/or printed.

As described herein, there are two types of scans that may be performed on a storage volume (e.g., $210_1$), namely a scan of the file system metadata (e.g., a master file table), or a find-first, find-next scan of the files of each relevant directory. In general, a scan of the file system metadata (e.g., FSMD $211_1$) is faster when there are a large number of files to scan, while a find-first, find-next scan, comprising sequentially iterating though the files in a specific namespace, is faster when there are a very small number of files to scan. However, in the event that a live volume is to be scanned, a file system metadata scan is a generally impractical solution, as set forth in the aforementioned U.S. Patent application entitled "Generating Storage Reports Using Volume Snapshots." Also, not all volumes are of a type of file system that has such a metadata database or the like, in which event a find-first, find-next scan is necessary.

As can be readily appreciated, while when available it is significantly faster (e.g., by an order of magnitude) to evaluate a file system metadata database record than it is to evaluate its corresponding file in a find-first, find-next scan, if there are only a relatively small number of files in a namespace but a relatively large number of records in the metadata database, it may be faster to evaluate the small number of files. This is because the file system metadata may be maintained in a large database on the volume that is not ordered according to any namespace, and thus the entire metadata database needs to be traversed in order to complete a scan. For example, if two namespaces c:\foo and c:\bar are to be scanned, and each contains ten total files in its directory including any subdirectories, it is much faster to perform a find-first, find-next scan of the twenty total files and any subdirectories than it is to scan one-thousand records in a metadata database looking for those twenty files, even though each record can be evaluated roughly an order of magnitude faster that its corresponding file. Conversely, if the directories corresponding to the namespaces contain eight thousand entries out of ten thousand total database records, it is clearly faster to scan the metadata database, given the approximate order of magnitude speed increase of a record over a file. Further, note that any time a file system metadata database scan is performed, a record is accessed for every file, and thus anytime a file system metadata database scan is more efficient, there is no need to separately perform a find-first, find next scan. For example, even if a very small amount of files are in one namespace, if the total amount of files when considered with the files of another namespace is large, a single file system metadata scan will be overall more efficient, and process both sets of files.

In keeping with the present invention, a planning module 242 analyzes various sets of information related to a scan in order to efficiently plan the scan. This information includes the namespace list 218 collected with each request for a storage report, volume/disk data 220 (as described below for scheduling parallel scans) and previous activity hints 222.

More particularly, with respect to previous activity hints, if a previous scan occurred, information gleaned from that previous scan may be used to better optimize the forthcoming scan. For example, the previous activity hints 222 can include information such as the number of files and directories on the volume $210_1$, the number of files and directories in a requested namespace or set of namespaces, the amount of fragmentation of the file system metadata (FSMD) $211_1$, and the like. Note that current information may not be otherwise available from the current volume (until after the scan is done), and although the previous information is not necessarily exact with respect to the current volume state, it is very often close to correct, because significant changes to volumes do not generally occur over a relatively short period of time. Further note that if desired, an administrator can override the planning module 242 or its defaults, such as to request a file system metadata scan regardless of the hints known from the previous scan, or to request a file system metadata scan can be based on some criteria, such as whenever more than some maximum number of days or hours have passed since the last scan.

In a typical situation in which the information 222 from the previous scan is used, the planning module 242 is able to determine from this information 222 if it is more efficient to scan a volume via a find-first, find-next method, or by scanning the file system metadata $211_1$ (when one is available). For example, a percentage of the number of files in the namespace to scan relative to the total number of files may be evaluated against threshold percentage values. As a more particular example, if less than x (e.g., ten) percent of a volume's total files need to be scanned, a find-first, find-next scan will be performed on that volume, while if more than y (e.g., fifteen) percent of a volume's total files need to be scanned, a file metadata database scan will be performed on that volume. If between x and y percent, one or more other criteria will be used to make the determination.

The planning module 242 also may be able to schedule the scans of different volumes in parallel, as described below.

To summarize, the scanning process is the most expensive operation, in terms of time and I/O; for example, scanning a terabyte-size volume might take hours. The present invention reduces the total time, in that if multiple reports are to be generated at the same time on the same file system namespace, the storage report engine 202 and planning module 242 consolidate these similar scans into a single phase, thereby avoiding repetitive scans of the same volume. However, when it is more efficient to perform multiple (e.g., small, find-first, find-next, partial) scans, the report engine may do so instead.

In accordance with another aspect of the present invention, another way to gain efficiency is via time consolidation, in which independent storage report generations that are close together in time are run together, when possible. More particularly, an administrator may specify an interval of time in which various storage reports may be requested and initiated. In essence, if two or more different clients, possibly completely different clients, request report generations at almost the same time, on a similar namespace, the report engine 202 may detect such a state, and consolidate the requests into a single scan.

Figure 4:
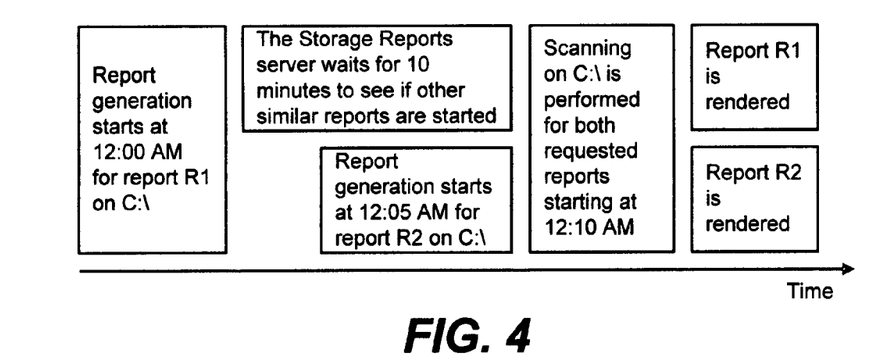
FIG. 4 is a representation of the storage report engine performing time consolidation, including waiting so as to generate reports simultaneously or near simultaneously, in accordance with various aspects of the present invention.

By way of example, FIG. 4 illustrates the generation of two independent reports ("Large Files" and "Least Recently Used Files") on the C:\volume. The first report is initiated (e.g., the request is received) at 12:00 AM, and the second one at 12:05 AM. Because there is a specified interval, e.g., ten minutes, before starting the actual scan, the second request can be processed and consolidated with the first request. Thus, FIG. 4 shows a single scan on C:\beginning at 12:10 AM, followed by two report renderings based on the intermediate data that was generated during the scan.

In general, time consolidation attempts to provide some window of time during which reports may be automatically consolidated, and may use any available information to do so. Thus, for example, if one administrator schedules a report to be generated at 11:00 PM on a volume snapshot taken at 10:00 PM, and another administrator specifies at 10:30 PM that a report should be generated right away based on the same snapshot, then (if allowed by administrator-controlled settings) the 11:00 PM report can be consolidated with the 10:30 pm scan rather than wait for its completion, which may be well after 11:00 PM. Both reports will be accurate because the snapshot data does not change.

In accordance with another aspect of the present invention, the planning module 242 may perform additional scheduling and/or staging of the scanning process. For example, consider a set of file system data that is shared across multiple reports, when the data is spread over a certain number of disks and volumes. In such a situation, the planning module 242 may further reduce the scanning time by having the scanner 228 read the scanning data from different spindles (physical disks) in parallel. This provides benefits because a primary bottleneck for report generation is the actual I/O. Note, however, that two volumes may be partitioned on the same spindle, in which case parallel scanning would be detrimental. Thus, the planning module 242 has knowledge of the on-disk layout, for example an association mapping the involved volumes and disks, via the volume-to-disk mapping data 220.

To determine a plan for parallel scanning, before starting the scanning phase, the planning module 242 establishes the list of disks that may be involved in the scan. Then, the planning module 242 creates a scanning plan by staging a (typically limited) number of disks to be scanned in parallel. Such a plan may be limited because too many parallel scans will overwhelm the system resources, and thus typically requires more than a simple parallel scheduling of all the volumes that are on different spindles.

By way of example, if scanning each disk will give an 80 MB/sec throughput, and maximum throughput is to be limited to 200 MB/sec (e.g., due to CPU usage limitations, or throughput limitations on the I/O path), then a maximum of two such disk scans can be performed in parallel.

Figure 5:
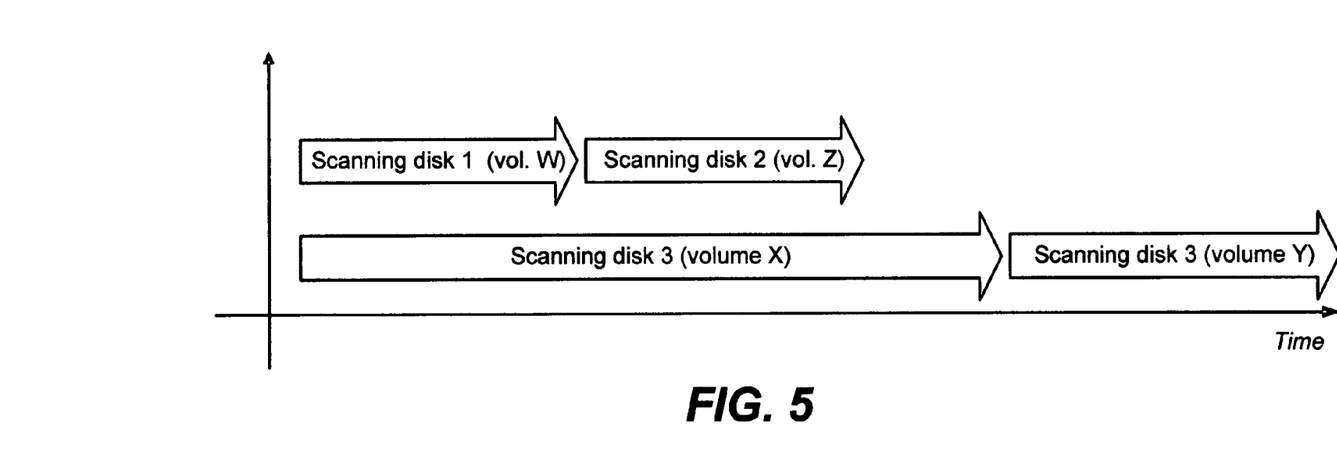
FIG. 5 is a representation of an execution plan for scanning disks in parallel, in accordance with various aspects of the present invention.

FIG. 5 illustrates a scanning plan for four volumes (W-Z) of different numbers of files on each (and/or sizes), where in this example a maximum of two disks can be scanned in parallel as described above. As can be seen in FIG. 5, there are four volumes on three disks (disk 1, disk 2 and disk 3) to be scanned. Based on the number of files, volume W and volume Z can be scanned within the time it takes to scan volume X, and because these volumes are on different spindles, there scans are scheduled sequentially with one another (since only two disks can be scanned at once in this example) and in parallel with the scan of volume X. Note that volume Y is not scanned directly after volume Z's scan completes, but rather waits until volume X's scan is complete, because both volumes are on the same disk (spindle), disk 3, and the physical movement required to read different volumes partitioned on the same spindle is highly inefficient.

Figure 6:
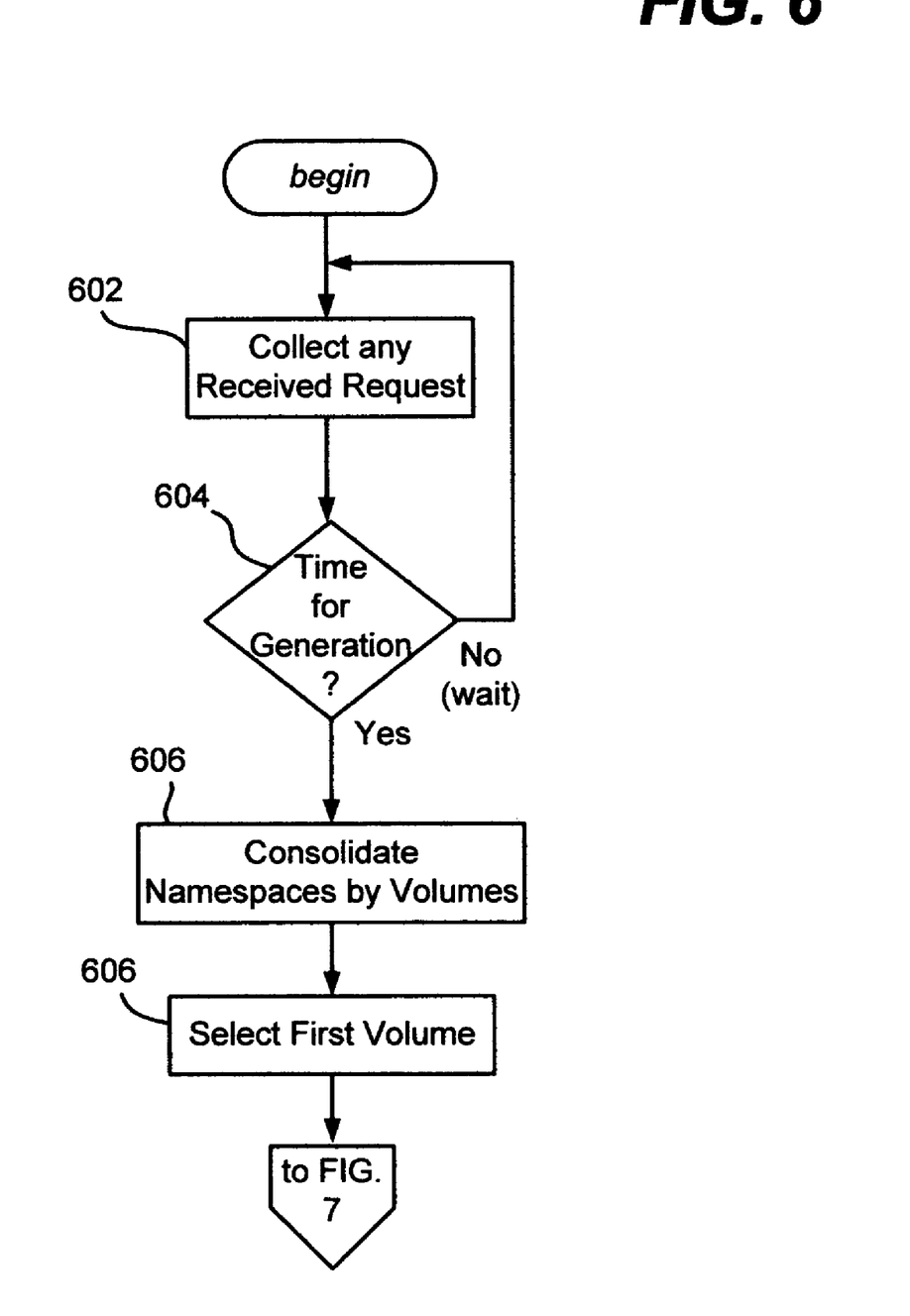
FIGS. 6-8 comprise a flow diagram generally representing example steps for efficiently generating storage reports via time consolidation, namespace consolidation and parallel generation, in accordance with various aspects of the present invention.
Figure 7:
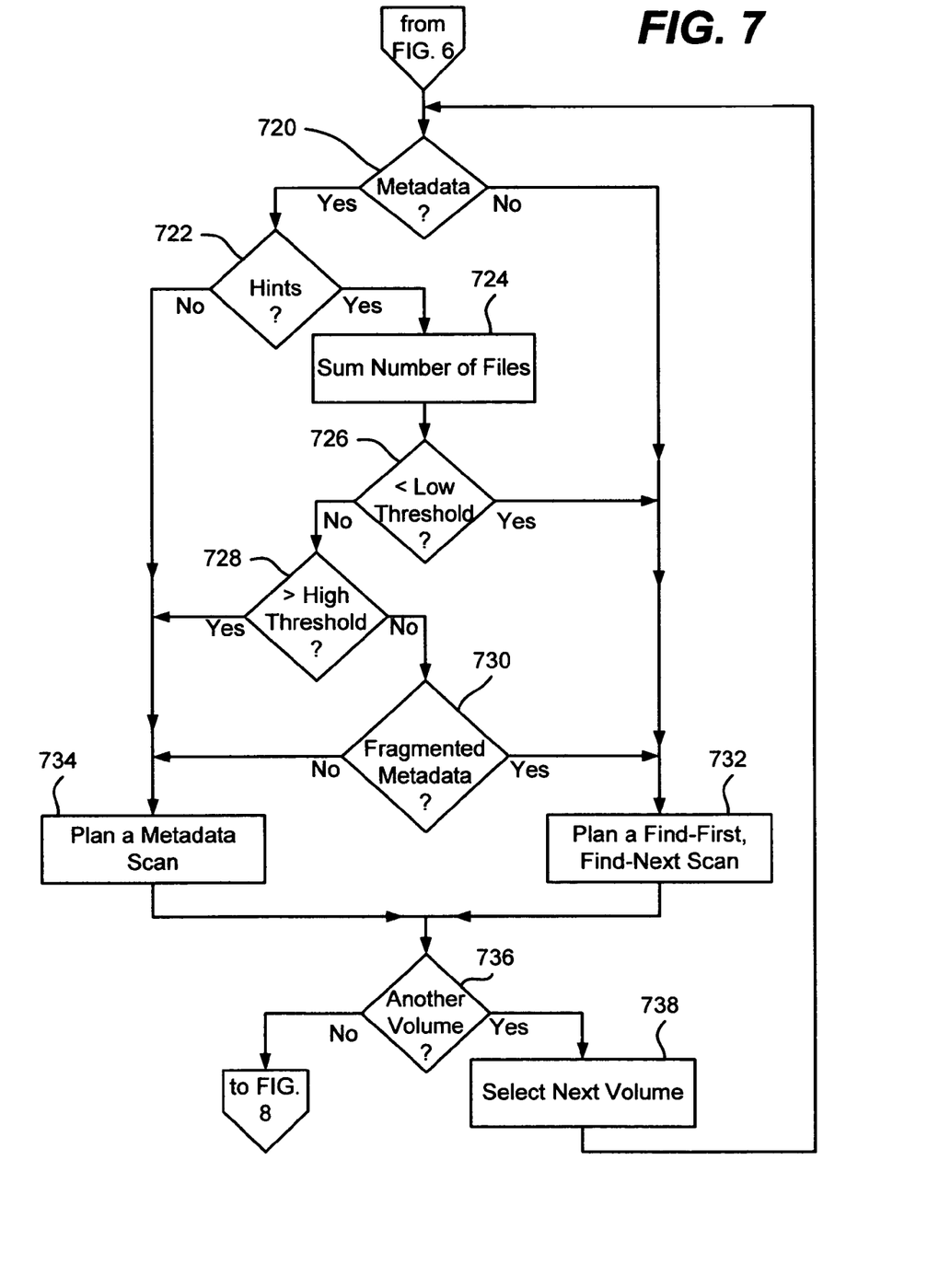
Figure 8:
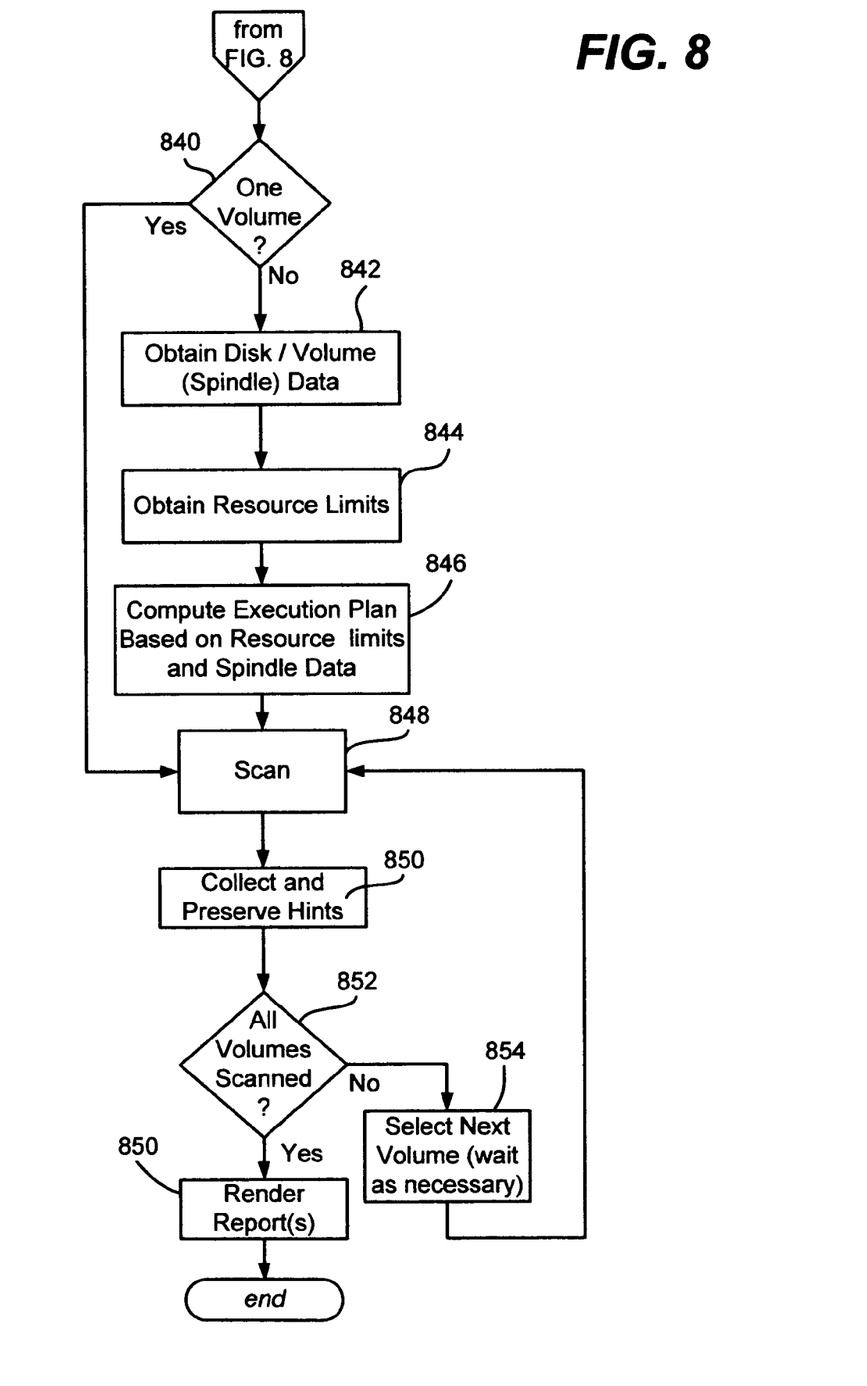

Turning to an explanation of the operation of the present invention, and by way of summary, FIGS. 6-8 represent example steps that may be taken to implement various aspects of the present invention. In general, the report generation service initiates generation of a report upon a client request. Essentially, as represented by step 602, the request is collected, along with possibly other requests. Step 604 represents delaying, for time consolidation purposes, for an appropriate amount of time to collect other requests; (note that wait is shown in FIG. 6 as a loop, but in actuality a timer event may trigger further operation).

At the time to run the report, step 606 represents consolidating the various namespaces. Note that alternatively, namespace consolidation may be performed as soon as each request is received, (although in the present example it is shown occurring once, at the time to start the scan). In such an alternative, after establishing the volumes and corresponding disks necessary for a scan, the report engine 202 may then perform the wait for a certain interval of time for other reports to appear, and consolidate them as received.

To consolidate namespaces and prepare for scanning, before starting the data gathering phase, the report engine 202 retrieves the list of reports that are scheduled at that period of time and their parameters. Based on this list, the report engine 202 isolates the list of directory roots that are involved in the data gathering. From these roots, the report engine 202 establishes the list of volumes that need to be investigated. For each volume, a list of root directories is obtained. Note that if a directory contains a volume mount point, the underlying volume is also browsed (by including its root directory in the namespace list), and so on.

Step 606 represents selecting a volume to evaluate for scanning. The process then continues to FIG. 7, where in general, the file system namespace will be scanned in a most efficient manner, avoiding duplicate scans of the same directory tree. For example, if two reports are based on the same namespace (the same directory roots), then the process does not enumerate the files twice in the same file system namespace. Note that for file system data, the data gathering phase is a resource-consuming operation.

As described above, two types of scanning are possible, namely find-first and find-next file enumeration, or file system metadata (e.g., MFT) scanning. Step 720 represents a determination as to whether the currently-selected volume contains file system metadata that can be scanned. If not, the process branches to step 732, where a find-first, find-next scan is planned for this volume. Otherwise, if there is file system metadata, step 722 evaluates whether there are hints from a previous scan as to how this volume can be best scanned the next time. Note that the hints may not exist because the volume has not been previously scanned, or because the hints have been deleted in some way, or are otherwise deemed expired. If there are no previous hints, step 722 branches to step 734 where a metadata scan is planned for this volume.

In the event that there are hints, step 722 instead branches to step 724 where the number of files to be evaluated in each namespace (based on the knowledge known from the previous scan's hints) essentially are summed; this result may be adjusted by the number of subdirectories to traverse. If at step 726 the total number of files is below a threshold value, such as a percentage based on the summed number of files divided by the total number of files in the file system metadata, (e.g., also estimated from the previous hints), then it is known to be more efficient to schedule a find-first, find-next scan of the directory or directories of the volume.

In the event that the total number is not below the low threshold, then step 728 is evaluated to determine whether the number of files calculation results in the volume scan being above a high threshold (e.g., percentage) value. In such an event, it is known that the large number (e.g., a high percentage of the total) to be scanned makes it faster to run a file system metadata scan, and thus step 728 branches to step 734 to plan a file system metadata scan for this volume. Note that these thresholds may be adjusted for optimum performance.

In the event that the number/percentage of files to scan is neither below the low threshold or above the high threshold, that is, it is in between, then one or more other criteria may be used to make a determination. For example, if the file system metadata database is fragmented (e.g., beyond a certain fragmentation level), then a low-level metadata scan will not offer significant performance advantages over the find-first, find-next method such as represented at step 730. Other criteria may be used, for example, such as how old the previous hints are, how accurate the previous hints tend to be when compared against the actual results, (e.g., the less accurate, the more the process may be weighted to a full metadata scan) and so forth.

Once a type of scan is known for the selected volume, steps 736 and 738 represent selecting another volume to make a similar set of determinations, until no volumes remain to be evaluated. The process then continues to FIG. 8 to plan parallel scans.

Step 840 of FIG. 8 evaluates whether there is only one volume to scan. If so, there will be no parallel scanning, whereby step 840 branches ahead to step 848 to scan the volume with a type of scan based on the determination that was made in FIG. 7. Otherwise, step 842 represents accessing the disk/volume (spindle) data 220 (FIG. 2) to determine which volumes, if any, are on the same spindle and thus should not be scanned simultaneously.

Step 844 represents obtaining the limits that are needed to determine how many parallel scans may occur at once. The limits may be set by an administrator, and/or computed to an extent based on actual I/O and processor limitations. With the maximum number known, step 846 computes an execution plan, essentially by making sure that no volumes on the same spindle execute at the same time, and filling in parallel scans up to the limit based on an estimated scanning completion time, which may be computed based on the number of files and the type of scan to be performed. Note that it is possible to dynamically adjust this execution plan, for example when the actual scan completes sooner or takes longer than expected. For example, if a volume is ready to be scanned and is not on the same spindle as another volume being scanned, its scan can begin as soon as a parallel scanning time slot opens up, even if not initially planned that way.

Step 848 presents performing the scan or parallel scans according to the execution plan. As described above, the disks are scanned in parallel to minimize unnecessary serialization of scans. Notwithstanding, a maximum throughput is maintained by limiting the number of parallel scans, and some serialization may be necessary to avoid scanning multiple volumes on the same spindle at the same time.

When the scan for a given volume is complete, step 850 represents collecting and preserving the hints for the next scan of that volume. Note that some or all of the hints may be accumulated during the scan, e.g., a total file counter may incremented as the scan proceeds, as well as per-directory file/subdirectory counters.

Step 852 evaluates whether all volumes have been scanned. If not, step 854 is performed, which represents selecting the next volume and beginning its scan. Note that if on the same spindle as another volume being scanned, it is necessary to wait for that volume to complete its scan, as in the example situation represented in FIG. 5 where a parallel scanning time slot is available but the volume/disk data has indicated that the two volumes are on the same spindle. Further, note that step 854 may instead return to step 846 to dynamically re-compute the execution plan based on actual state, as described above.

Step 850 represents rendering the report or reports when all volumes have been scanned. As can be readily appreciated, step 850 is only an example for purposes of illustration; in actuality, a report or set of reports may be rendered as soon as each volume corresponding to that report has been scanned. For example, if one report is based on c:/, d:/ and e:/ being scanned, and those volumes have been scanned, there is no reason to delay its rendering until a scan of f:/ has been completed for another independent report.

As can be seen from the foregoing detailed description, there is provided a method and system that plans storage report generation so as to be efficient and fast. Namespace consolidation, time consolidation and/or parallel scanning may be part of the plan. To remain efficient, the storage report generation is limited by actual resource constraints and physical layout of volumes.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment comprising at least a processor and a memory, a method comprising:

receiving a first request for a first storage report, the first request including an indication of information that is to be determined by scanning at least a portion of a namespace on a storage volume;

receiving a second request for a second storage report, the second request including an indication of information that is to be determined by scanning the same portion of the namespace on the storage volume;

consolidating the first request and the second request, such that the storage volume information indicated in the first request and the storage volume information indicated in the second request are both simultaneously ascertainable from a single storage volume scan;

planning a storage volume scan based on:
  the consolidated requests for storage reports corresponding to the namespace, the storage volume scan being configured to scan the namespace for both the storage volume information indicated in the first request and the storage volume information indicated in the second request simultaneously in a single scan; and
  one or more activity hints;

overriding the storage volume scan based on the consolidated requests and the activity hints, such that the storage volume scan is based on one or more user inputs;

performing the storage volume scan as indicated by the user inputs to simultaneously ascertain both the storage volume information indicated in the first request and the storage volume information indicated in the second request; and generating a plurality of reports based on the scanned information, each report in the plurality of reports corresponding to a request for information including at least one of the first request and the second request.

2. The method of claim 1 wherein planning the volume scan comprises planning a single scan of file metadata of the storage volume.

3. The method of claim 2 wherein planning the single scan of the file system metadata of the storage volume comprises evaluating a number of files of each directory against a total number of files on the storage volume.

4. The method of claim 3 further comprising, accessing previous information to estimate the number of files of each directory and the total number of files on the storage volume.

5. The method of claim 1 wherein planning the volume scan comprises planning a find-first, find-next scan of at least two different directories of the storage volume.

6. The method of claim 1 further comprising, waiting for an interval to receive the second request after receiving the first request.

7. The method of claim 1 further comprising, planning the volume scan with parallel scanning of at least one other volume.

8. At least one computer-readable storage medium having computer-executable instructions stored thereon, which upon execution perform the method of claim 1.

9. At least one computer-readable storage medium having computer-executable instructions stored thereon, which upon execution perform steps, comprising:

receiving a first request for a first storage report, the first request including an indication of information that is to be determined by scanning at least a portion of a namespace on a snapshot of a storage volume;

receiving a second request for a second storage report, the second request including an indication of information that is to be determined by scanning the same portion of the namespace on the snapshot of the storage volume;

consolidating the first request and the second request, such that the storage volume snapshot information indicated in the first request and the storage volume snapshot information indicated in the second request are both simultaneously ascertainable from a single storage volume snapshot scan;

planning a storage volume snapshot scan based on the consolidated requests for storage reports corresponding to the namespace, the storage volume snapshot scan being configured to scan the namespace for both the storage volume snapshot information indicated in the first request and the storage volume snapshot information indicated in the second request simultaneously in a single scan;

performing the planned storage volume snapshot scan to simultaneously ascertain both the storage volume snapshot information indicated in the first request and the storage volume snapshot information indicated in the second request; and generating a plurality of reports based on the scanned information, each report in the plurality of reports corresponding to a request for information including at least one of the first request and the second request.

10. The computer-readable storage medium of claim 9 wherein planning the scan of the snapshot volume set comprises performing at least one step of a set of steps, the set including, performing namespace consolidation, determining for at least one storage volume snapshot whether to scan file system metadata or scan via a find-first, find-next scan, and scanning at least two volume snapshots in parallel with one another.

11. The computer-readable storage medium of claim 10 wherein performing namespace consolidation comprises scanning across common namespaces, common snapshot volumes and/or by waiting to receive two different requests for storage reports.

12. The computer-readable storage medium of claim 10 wherein determining whether to scan file system metadata or scan via a find-first, find-next scan comprises evaluating information maintained from a previous scan.

13. The method of claim 1, wherein the first request for the first storage report requests a first type of storage volume snapshot information and the second request for the second storage report requests a second, different type of storage volume snapshot information.

14. The method of claim 1, further comprising:

receiving an indication that all storage report requests received within a certain time frame are to be consolidated for processing in single scan;

automatically consolidating those storage report requests received within the time frame, such that the consolidated requests can be simultaneously processed in a single scan.

15. The method of claim 1, wherein planning a storage volume snapshot scan further comprises analyzing various sets of information related to the scan including at least one of a namespace list, volume-to-disk mapping data for scheduling parallel scans and previous activity hints.

16. The method of claim 15, wherein previous activity hints comprise information from at least one previous scan to better optimize the forthcoming scan, the hints including at least one of the total number of files and directories on a snapshot volume, and the number of files and directories in a requested namespace or set of namespaces and the amount of fragmentation of the storage volume snapshot.

17. The computer-readable storage medium of claim 9, further comprising:

determining that a storage volume snapshot scan has been planned based on one or more activity hints; and overriding the plan based on the activity hints, such that the storage volume snapshot scan is based on one or more user inputs.

18. In a computing environment comprising at least a processor and a memory, a method for combining multiple storage volume snapshot scan requests, such that the requests can be processed simultaneously in a single storage volume snapshot scan, the method comprising:

receiving a plurality of storage volume snapshot scan requests requesting information about data stored on a snapshot of a storage volume;

consolidating the scan requests, such that the requests can be processed simultaneously in a single storage volume snapshot scan;

accessing information including activity hints from at least one previous storage volume snapshot scan;

based on the accessed information, determining, from a list of available volume scans, which snapshot volume scan is most efficient;

performing the determined storage volume snapshot scan;

generating intermediate data during the scan indicating information corresponding to that information requested in the storage volume snapshot scan request; and rendering one or more storage volume snapshot reports in a user-selected format based on the generated intermediate data.

19. The method of claim 1, wherein the user input comprises an indication of one or more criteria that are to be used as the basis of the scan.

20. The method of claim 19, wherein the criteria indicates that a file system metadata scan is to be performed based on the criteria.

* * * * *